3,728,336
(LOWER)ALKOXYTETRAHYDROPYRANYL ETHERS AND 5',6'-DIHYDRO-2H-PYRAN-4'YL ETHERS OF 7β-METHYL-Δ⁴-ANDROSTANES
Alexander D. Cross, San Francisco, and John A. Edwards, Los Altos, Calif., assignors to Syntex Corporation, Panama, Republic of Panama
No Drawing. Continuation-in-part of applications Ser. No. 731,300, May 22, 1968, and Ser. No. 766,321, Oct. 9, 1968. This application May 11, 1970, Ser. No. 36,457
Int. Cl. C07c *173/00*
U.S. Cl. 260—239.55 R                    12 Claims

ABSTRACT OF THE DISCLOSURE

The 4'-(lower)alkoxytetrahydropyran-4'-yl ethers and 5',6'-dihydro-2H-pyran-4'-yl ethers of 7β-methyl-Δ⁴-androstanes have high oral anabolic activities.

---

This is a continuation-in-part of United States patent applications Ser. No. 731,300, filed May 22, 1968 and Ser. No. 766,321, filed Oct. 9, 1968.

This invention relates to novel and useful 4'-(lower) alkoxytetrahydropyran-4'-yl ethers and 5',6'-dihydro-2H-pyran-4'-yl ethers of 7β-methyl-Δ⁴-androstanes which can be represented by the formula:

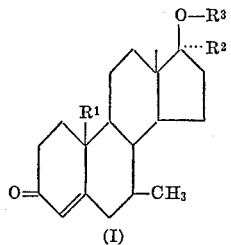

(I)

In the above formula, $R^1$ is hydrogen or methyl;
$R^2$ is hydrogen or lower alkyl; and
$R^3$ is a 4'-(lower)alkoxytetrahydropyran-4'-yl or 5',6'-dihydro-2H-pyran-4'-yl group.

The compounds represented by Formula I are anabolic agents with a favorable anabolic:androgenic ratio, also possess anti-estrogenic, anti-gonodatropic, and anti-fibrillatory activities, and can be used in the same manner as testosterone. These compounds are administered by the usual routes, whether orally or parenterally, either alone or in conjunction with other medicinal agents, or in pharmaceutically acceptable, non-toxic compositions formed by the incorporation of any of the normally employed excipients.

The terms "lower alkyl" and derivatives thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl and the like.

The compounds of Formula I can be prepared from the corresponding 17β-hydroxy compounds. The latter are reacted under substantial anhydrous conditions with an excess of 4'-(lower)alkoxy-5',6'-dihydro-2H-pyran. The hydroxy compounds are reacted, for example, with from about 2 to about 50 or more molecular equivalents of the pyran reagent in the presence of a small amount of an acidic catalyst, such as hydrochloric acid, p-toluenesulfonic acid, boron trichloride etherate, and the like, either alone or together with an inert, organic solvent, such as benzene, diethyl ether, methylene chloride, or the like. The reaction is carried out at a temperature ranging from about 0° C. to about 80° C. (preferably at around room temperature, i.e., 25° C.) for about 5 minutes to about 48 hours, thus giving the corresponding ethers represented by Formula I. In carrying out this reaction, a mixture of the respective 4'-(lower)alkoxytetrahydropyran-4'-yl ethers and 5',6'-dihydro-2H-pyran-4'-yl ethers are formed. Use of non-hydrocarbon solvents for the reaction medium, lower catalyst concentrations, and shorter reaction times increase the yield of the 4'-(lower)alkoxytetrahydropyran-4'-yloxy compounds. The two reaction products are then separated by conventional procedures.

For example, the two reaction products can be separated and purified by column chromatography with neutral alumina, eluting with hexane and hexane-benzene solutions. The fractions containing the compounds are identified by spectroscopic techniques. The 5',6'-dihydro-2H-pyran-4'-yl ethers, being less polar, are eluted first. After fractions containing mixtures of the two products, fractions containing the 4'-(lower)alkoxytetrahydropyran-4'-yl ethers are obtained. The compounds are obtained by evaporating the solvents.

Alternatively, the two products can be separated and purified by preparative thin layer chromatography. The reaction mixture is applied to a preparative plate containing a phosphor, and the plate is developed with a hexane-ethyl acetate mixture containing a trace of pyridine. The plates are dried, and the bands containing the separated products are identified under ultraviolet light, the silica gel in each zone being collected and eluted with tetrahydrofuran. The solvent is evaporated to dryness to yield the isolated products.

The 4'-(lower)alkoxy-5',6'-dihydro-2H-pyran reactants used to form the ethers of this invention can be prepared by well known methods. For example, tetrahydro-4-pyrone can be reacted with a primary or secondary lower alkanol under acidic conditions to form the intermediate, 4',4'-di(lower)alkoxytetrahydropyran, which upon distillation with an acid, such as toluenesulfonic acid or mesitylenesulfonic acid, yields the 4'-(lower)alkoxy-5',6'-dihydro-2H-pyran product. Such a method is described by Reese et al. J. Am. Chem. Soc. 89, 3367 (1967). The lower alkanol is preferably methanol but it can be other lower alkanols such as ethanol, propanol, isopropanol, butanol, isobutanol, pentanol, amyl alcohol, hexanol, and the like, to form the corresponding pyrans, such as, for example, 4'-methoxy-5',6'-dihydro-2H-pyran, 4'-ethoxy-5',6'-dihydro-2H-pyran, etc.

The 17β-hydroxy compounds from which the compounds of Formula I are prepared and methods suitable for preparing them have been described in U.S. Patents Numbers 3,213,086, 3,262,949, and 3,341,557 and by Zderic et al. Steroids 81, 432 (1959).

This invention is further illustrated by the following specific but non-limiting examples.

EXAMPLE 1

To a solution of 1 g. of 17β-hydroxy-7β-methylandrost-4-en-3-one and 25 ml. of benzene there is added 2 ml. of 4'-methoxy-5',6'-dihydro-2H-pyran. Next, approximately 5 ml. of the mixture of benzene and dihydropyran is distilled off to remove moisture, and the remaining mixture is then cooled to room temperature. To the cooled mixture is then added 0.1 g. of p-toluenesulfonic acid, and the resulting reaction mixture is held at room temperature for 72 hours. Following this reaction period, the reaction mixture is washed with an aqueous 5 percent sodium carbonate solution and then with water until a neutral pH is obtained, then dried over anhydrous sodium sulfate and evaporated to dryness. The dry residue is then applied to a hexane solution to a column of 80 g. of neutral alumina. The column is then carefully eluted with hexane and hexane-benzene (increasing the benzene concentration in steps of 5 percent, i.e. 5 percent, 10 percent, 15 percent benzene, etc.). The fractions obtained at the various concentrations of benzene are collected, and those containing the products are identified by spectroscopic techniques. The 5',6'-dihydro-2H-pyran-4'-yl ether is eluted first. Following this eluant portions containing both ether products, and then fractions containing the 4'-methoxytetrahydropyran-4'-yl ether is obtained. The solvents are evaporated to yield the two separated products 17β-(5',6'-dihydro-2H-pyran-4'-yloxy)-7β - methylandrost - 4-en-3-one and 17β-(4'-methoxytetrahydropyran-4'-yloxy)-7β-methylandrost-4-en-3-one.

EXAMPLE 2

Repeating the procedure of Example 1 but replacing the 17β-hydroxy-7β-methylandrost-4-en-3-one with 17β-hydroxy-7β-methylestr-4-en-3-one,
17β-hydroxy-17β,17α-dimethylandrost-4-en-3-one,
17β-hydroxy-7β,17α-dimethylestr-4-en-3-one,
17α-ethyl-17β-hydroxy-7β-methylandrost-4-en-3-one, and
17α-ethyl-17β-hydroxy-7β-methylestr-4-en-3-one, yields the corresponding 17β-(4'-methoxytetrahydropyran-4'-yloxy)-7β-methylestr-4-en-3-one,
17β-(5',6'-dihydro-2H-pyran-4'-yloxy)-7β-methylestr-4-en-3-one,
17β-(4'methoxytetrahydropyran-4'-yloxy)-7β,17α-dimethylandrost-4-en-3-one,
17β-(5',6'-dihydro-2H-pyran-4'-yloxy)-7β,17α-dimethylandrost-4-en-3-one,
17β-(4'-methoxytetrahydropyran-4'-yloxy)-7β,17α-dimethylestr-4-en-3-one,
17β-(5',6'-dihydro-2H-pyran-4'-yloxy)-7β,17α-dimethylestr-4-en-3-one,
17α-ethyl-17β-(4'-methoxytetrahydropyran-4'-yloxy)-7β-methylandrost-4-en-3-one,
17α-ethyl-17β-(5',6'-dihydro-2H-pyran-4'-yloxy)-7β-methylandrost-4-en-3-one,
17α-ethyl-17β-(4'-methoxytetrahydropyran-4'-yloxy)-7β-methylestr-4-en-3-one, and
17α-ethyl-17β-(5',6'-dihydro-2H-pyran-4'-xloxy)-7β-methylestr-4-en-3-one, respectively.

EXAMPLE 3

Repeating the procedure of Example 1 but replacing 4'-methoxy-5',6'-dihydro-2H-pyran with other 4'-(lower) alkoxy-5',6'-dihydro-2H-pyrans, e.g. 4'-ethoxy-5',6'-dihydro-2H-pyran, the corresponding 17β-(4'-loweralkoxytetrahydropyran-4'-yloxy)-7β-methylandrost-4-en-3 - ones such as 17β - (4' - ethoxytetrahydropyran - 4'-yloxy)-7β-methylandrost-4-en-3-one and the like are obtained.

EXAMPLE 4

A solution of 1 g. of 17β-hydroxy-7β-methylestr-4-en-3-one in 40 ml. of benzene is distilled azeotropically to remove 3 ml. of benzene, thus removing moisture. A solution of 100 mg. p-toluenesulfonic acid in 100 ml. of benzene is added to the solution, and then 1 ml. of 4'-methoxy-5',6'-dihydro-2H-pyran. The mixture is stirred for 50 minutes at room temperature, buffered with dry ethylamine and extracted with ether-water. The ether phase is separated and evaporated to dryness, and 200 mg. of the residue is applied to a preparative meter plate coated with silica gel. The plate is developed with hexane-ethylacetate (2:1) containing a trace of pyridine and dried. The bands containing the 17β-(5',6'-dihydro-2H-pyran-4'-yloxy)-7β-methylestr-4-en-3-one and 17β-(4'-methoxytetrahydropyran-4'-yloxy)-7β-methylestr-4-en - 3-one are identified (the latter is the least polar and travels further), removed and eluted. The solvent is dried to yield the respective, separated compounds as yellow amorphous compounds.

The invention claimed is:

1. A steroid ether represented by the formula:

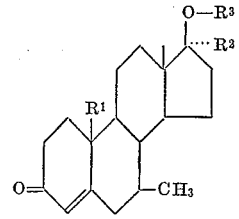

wherein

R¹ is hydrogen or methyl;
R² is hydrogen or lower alkyl; and
R³ is 4'-(lower)alkoxytetrahydropyran-4'-yl or a 5',6'-dihydro-2H-pyran-4'-yl group.

2. Compounds of claim 1 wherein R³ is a 4'-(lower) alkoxytetrahydropyran-4'-yl group.
3. The compounds of claim 2 wherein R³ is a 4'-methoxytetrahydropyran-4'-yl group.
4. A compound of claim 3 wherein R² is hydrogen.
5. A compound of claim 4 wherein R¹ is methyl.
6. A compound of claim 4 wherein R¹ is hydrogen.
7. A compound of claim 3 wherein R² is methyl.
8. A compound of claim 7 wherein R¹ is methyl.
9. A compound of claim 7 wherein R¹ is hydrogen.
10. A compound of claim 3 wherein R² is ethyl.
11. A compound of claim 7 wherein R¹ is methyl.
12. A compound of claim 7 wherein R¹ is hydrogen.

References Cited

UNITED STATES PATENTS

| | | | |
|---|---|---|---|
| 3,213,086 | 10/1965 | Cross | 260—239.55 |
| 3,301,879 | 1/1967 | Wettstein et al. | 260—397.5 |
| 3,520,880 | 7/1970 | Cross et al. | 260—239.55 |
| 3,525,740 | 8/1970 | Cross et al. | 260—239.55 |

HENRY A. FRENCH, Primary Examiner

U.S. Cl. X.R.

260—999

UNITED STATES PATENT OFFICE
CERTIFICATE OF CORRECTION

Patent No. 3,728,336        Dated April 17, 1973

Inventor(s) A.D. Cross and J.A. Edwards

It is certified that error appears in the above-identified patent and that said Letters Patent are hereby corrected as shown below:

Column 1, line 4, "4'yl" should read -- 4'-yl --.

Column 3, line 18, "17β",17α should read -- 7β--,17α.

Signed and sealed this 25th day of December 1973.

(SEAL)
Attest:

EDWARD M. FLETCHER, JR.
Attesting Officer

RENE D. TEGTMEYER
Acting Commissioner of Patents